US005395129A

United States Patent [19]

Kao

[11] Patent Number: 5,395,129

[45] Date of Patent: Mar. 7, 1995

[54] WHEEL CHAIR

[76] Inventor: Chin-Hsing Kao, No. 127, Shiko St., Taipei, Taiwan, Taiwan, Prov. of China

[21] Appl. No.: 43,738

[22] Filed: Apr. 7, 1993

[51] Int. Cl.$^{6}$ ........................ A61G 5/06; B62D 55/04

[52] U.S. Cl. .................................... 280/5.22; 180/8.2; 180/9.30; 180/9.32; 180/907; 280/DIG. 10

[58] Field of Search ................ 180/82, 9.1, 9.21, 9.26, 180/9.28, 9.3, 907, 9.32; 280/5.2, 5.22, DIG. 10

[56] References Cited

U.S. PATENT DOCUMENTS 3,231,290 1/1966 Weyer ................................ 280/5.22
3,869,011 3/1975 Jensen ................................ 280/5.22
5,158,309 10/1992 Quigg ................................ 280/5.22

FOREIGN PATENT DOCUMENTS 1459962 2/1989 U.S.S.R. ............................ 280/5.22

*Primary Examiner*—Mitchell J. Hill

*Attorney, Agent, or Firm*—Morton J. Rosenberg; David I. Klein

[57] ABSTRACT

This invention relates to a wheel chair which is composed of a seat, a track device, a cushion device and an angle-regulate device so as to make the wheel chair can cross over the ditch or go up or down the stairs, when going up the stairs, user must lift the main wheels upwardly so as to make the track assembly contact the ground, then sliding the seat to the front slant part of the guide groove by its rollers, when the wheel chair going up to the last stairs, it can be returned to the horizontal position by means of the cushion device, when going down the stairs, user must slide the seat to the rear slant part of the guide groove, then going down the stairs by means of the track assembly, furthermore when the wheel chair crossing over the ditch, user must move first the seat to rear part of the wheel chair until the front part of the track assembly run over the ditch, then moving the seat to the front part so as to make the wheel chair cross over the ditch.

5 Claims, 8 Drawing Sheets

WHEEL CHAIR

BACKGROUND OF THE INVENTION

This invention relates to a wheel chair which includes a track device, a cushion device and an angle regulation mechanism to permit the wheel chair to cross over ditches or other impediments as well as negotiate stairs.

Conventional wheel chairs have the following defects: (1) conventional wheel chairs cannot negotiate stairs and the user has to rely on others to lift the wheel chair over the stairs, which is inconvenient and, (2) conventional wheel chairs cannot negotiate ditches, whereby the user must make a detour which is inconvenient and is a waste of time.

SUMMARY OF THE INVENTION

It is therefore the main object of this invention to provide a wheel chair which includes a track mechanism, a cushion mechanism and an angle regulation mechanism where the position of the seat may be displaced to incline a guide groove in order to allow the wheel chair to easily negotiate stairs.

It is a further object of this invention to provide a wheel chair which can cross over a ditch by means of changing the position of its seat with a track assembly to permit passage over the ditch.

BRIEF DESCRIPTION OF THE DRAWINGS

For the purpose of promoting an understanding of the principles of the invention, reference will be made to the embodiment illustrated in the drawings.

DETAILED DESCRIPTION OF THE PREFERRED EMBODIMENTS

Figure 1:
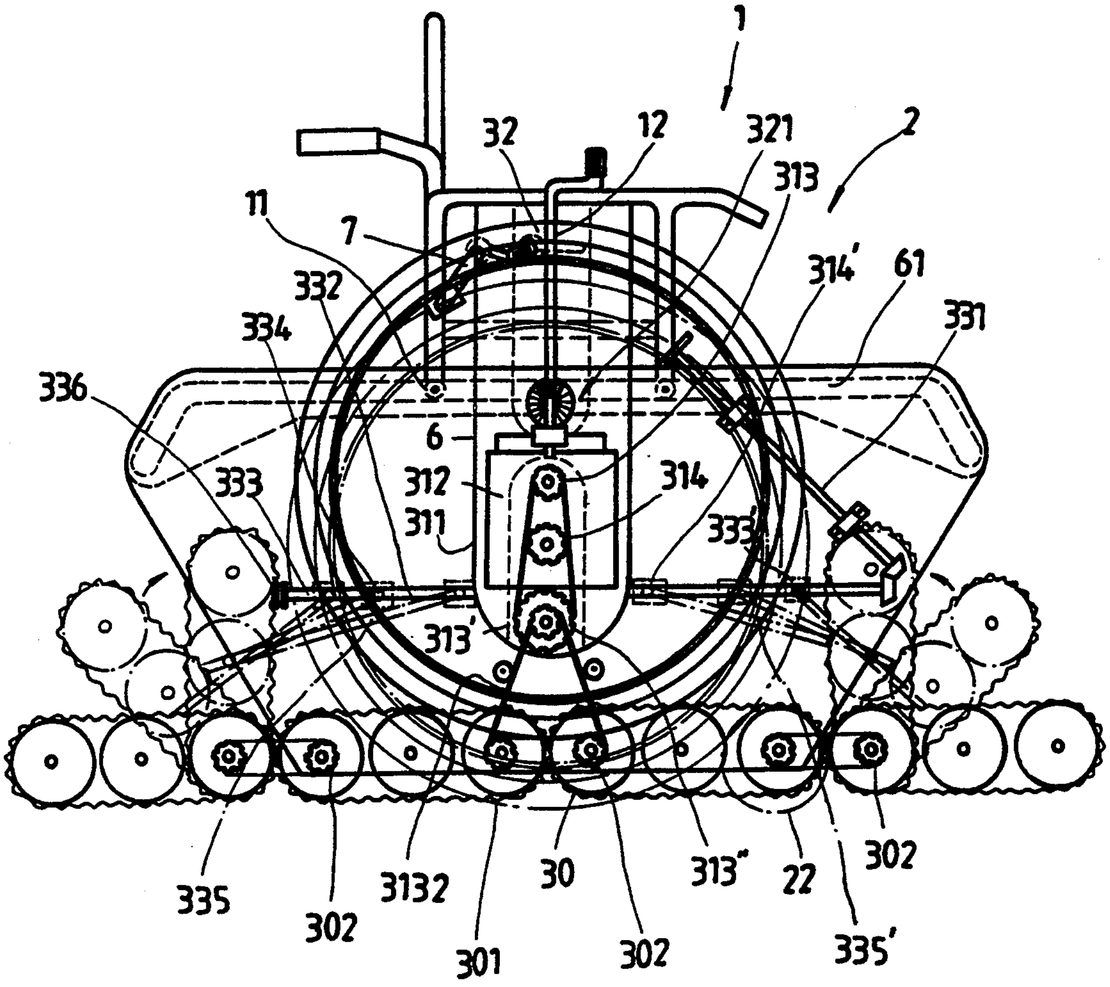
FIG. 1 is an elevational view of this invention.
Figure 2:
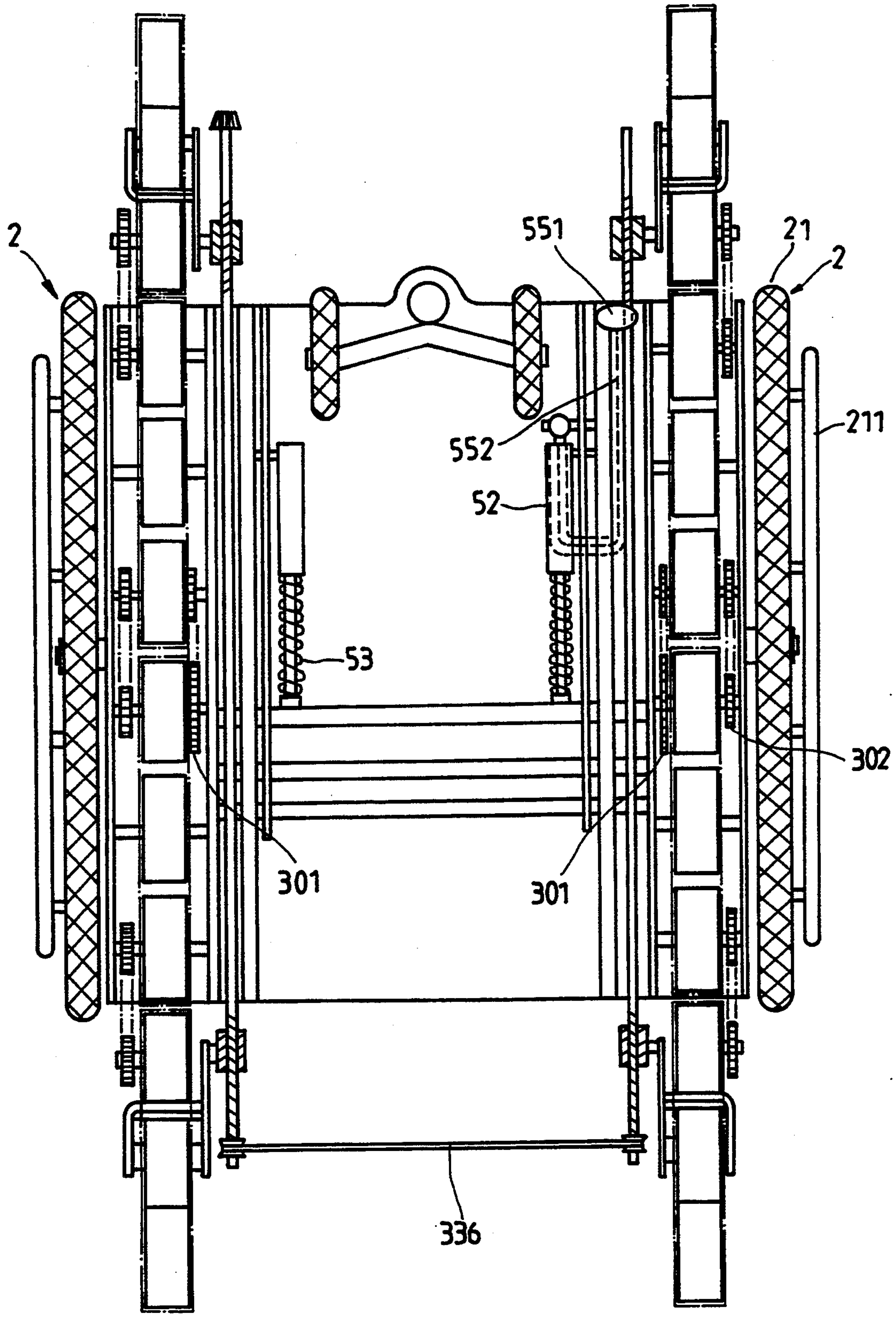
FIG. 2 is a bottom plan view of this invention.
Figure 3:
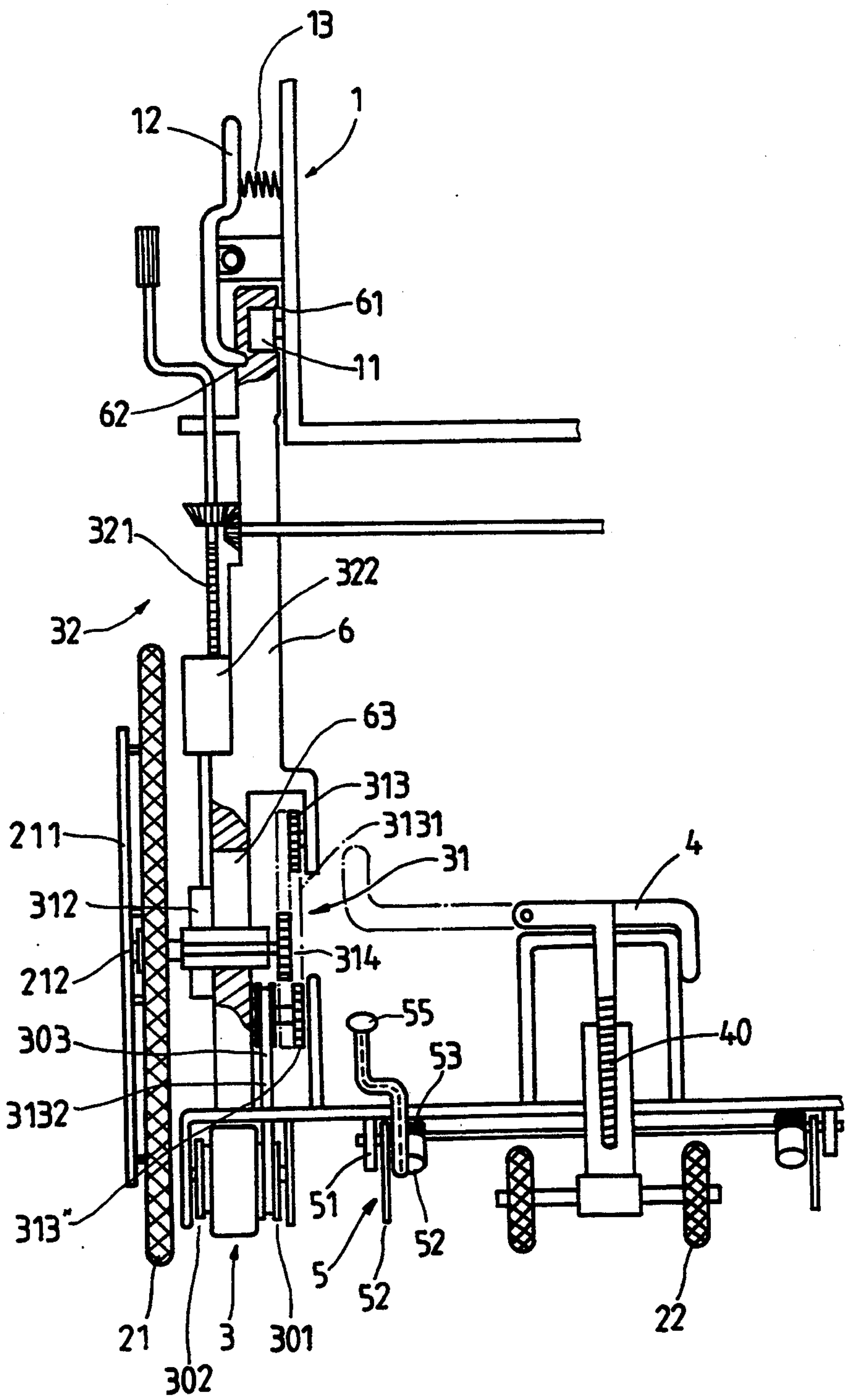
FIG. 3 is a partially cut-away front view showing the track device of this invention.
Figure 4:
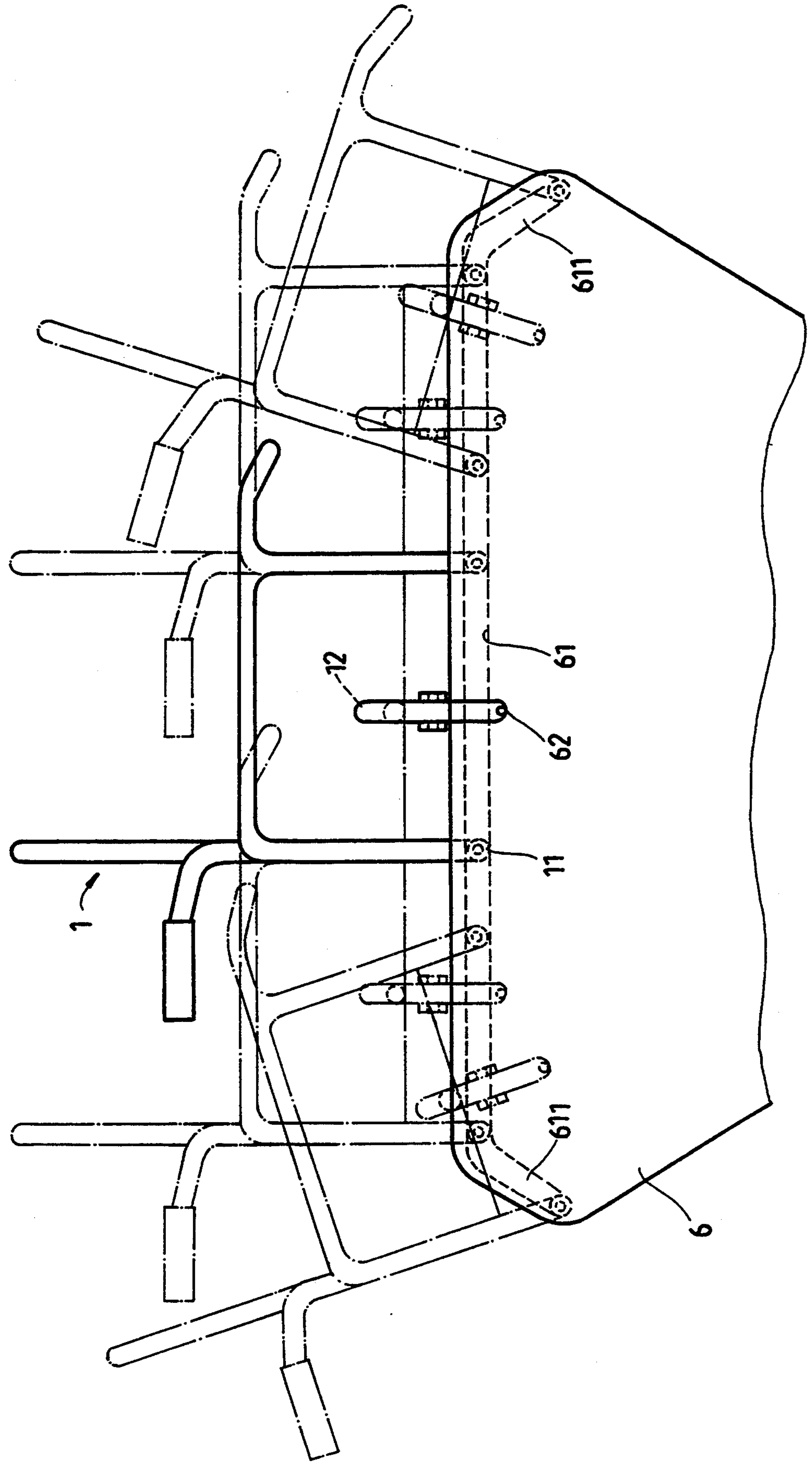
FIG. 4 is a partially cut-away plan view showing the wheel chair seat displaced in the guide grooves.

Referring to FIGS. 1–6B, the invention comprises a seat 1, a wheel assembly 2, a track device 3 and a cushion device 5. For purposes of clarity, one side of the wheel chair of the present invention will be described due to symmetrical equivalence of the wheel chair. The bottom of the seat 1 includes rollers 11 shown in FIG. 3 which are engaged respectively in the guide groove 61 of the side plate 6. The ends of each guide groove 61 are formed into inclined portions 611 and 611', shown in FIG. 4. Mounted on one side of the seat 1 there is provided a fixing post 12 attached to the seat 1 by a spring 13. When the seat 1 is displaced an end of the fixing post 12 slides into a respective one of the fixing holes 62 formed within the side plate 6 so as to positionally locate the seat 1, as shown in FIG. 4.

The wheel assembly 2 includes a pair of main wheels 21 installed on opposing sides of the seat 1 and a pair of auxiliary wheels 22. Each main wheel 21 has a swivel table 211 which is provided as a hand hold for the user to easily rotate the pair of main wheels 21.

Figure 5:
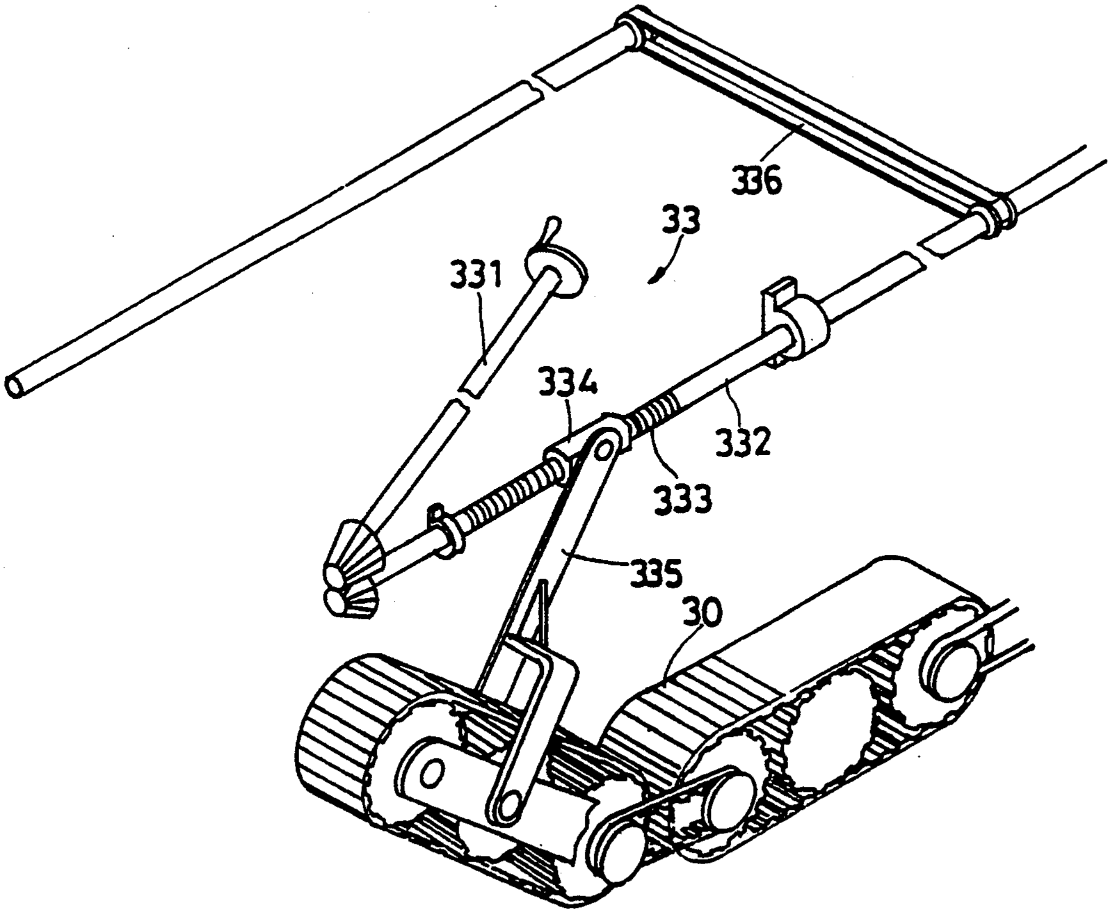
FIG. 5 is a partial perspective view showing the angle regulation mechanism.

Referring to FIGS. 3 and 5, the track device 3 is installed on the side plate 6 and comprises a track assembly 30, a lifting mechanism 31 and an operative mechanism 32. The track assembly 30 has engaging teeth formed on an inner surface so as to engage chain wheel 302. The chain wheels 301 and 302 are mounted on the same shaft. The forward and rear section of the track assembly 30 are adapted to be inclinable up to 45 degrees by means of the angle regulation mechanism 33 so as to allow the wheel chair to negotiate stairs easily. The lifting mechanism 31 includes a guide block 312, driving chain wheels 313 and 313' as well as a moving chain wheel 314. The guide block 312 is coupled to the main wheel shaft 212 and can be displaced within the aperture 63 of the side plate 6. The moving chain wheel 314 is mounted on one side of the main wheel shaft 212 with the upper driving chain wheel 313 and the lower driving chain wheel 313' connected by a double-row chain 3131. When the moving chain wheel 314 is moved upwardly to the position of the upper driving chain wheel 313, the upper and the lower driving chain wheel 313, 313' are simultaneously rotated with the main wheel 21. The lower driving chain wheel 313' has a coaxial second lower driving chain wheel 313" which is connected with the chain wheel 303 of the track assembly 30 by means of a chain 3132 in order to drive the track assembly 30. The operative mechanism 32 includes a lead screw 321. One end of the lead screw 321 is formed into a handle and extends vertically into the area of seat 1. An opposing end of the lead screw 321 is mounted in threaded block 322 which is connected to the guide block 312. When the handle of the lead screw 321 is turned, the guide block 312 and the thread block 322 are displaced along the lead screw 321. The lead screw 321 is fitted with a bevel gear 330 which engages with one end of a transmission shaft. The other end of the transmission shaft is coupled to another lead screw installed on an opposing side of the wheel chair so as to control the lifting of the two main wheels 21 synchronously.

Referring to the track assembly 30, when the lead screw 321 is turned, the moving chain wheel 314 is displaced upwardly together with the guide block 312. Simultaneously, the main wheel 21 is also displaced upwardly and the track assembly 30 contacts the ground. Also, when the moving chain wheel 314 is displaced upwardly to engage the double-row chain 3131, the upper driving chain wheel 313 and the lower driving chain wheel 313" are driven by the double-row chain 3131. Meanwhile, the second lower driving chain wheel 313" drives the chain wheels 301 and 302 of the track assembly 30 by means of the chain 3132. The front and rear portions of the track assembly 30 can be inclined up to 45 degrees by means of angle regulation mechanism 33. The angle regulation mechanism 33 includes a control bar 331, a driving shaft 332, two slide blocks 334 and two links 335 and 335'. The end of the control bar 331 has a bevel gear which is engagingly mated with a bevel gear installed on the end of the driving shaft 332, shown in FIG. 5, opposing ends of the driving shaft 332 having relative threads 333, 333' which can be fitted respectively with the slide blocks 334 and 334'. Opposing ends of the links 335 and 335' are hinged on the bracket of the track assembly 30 as shown in FIG. 5. When the control bar 331 is turned to rotate the driving shaft 332, the two slide blocks 334 and 334' on the driving shaft 332 are moved forward or backward synchronously by means of the interface with the threads 33 and 333' in order to regulate the angle of the front and rear sections of the track assembly 30. The driving shaft 332 can drive synchronously the other driving shaft installed on the other side of the wheel chair by a transmission belt 336, shown in FIG. 2.

Figure 6A:
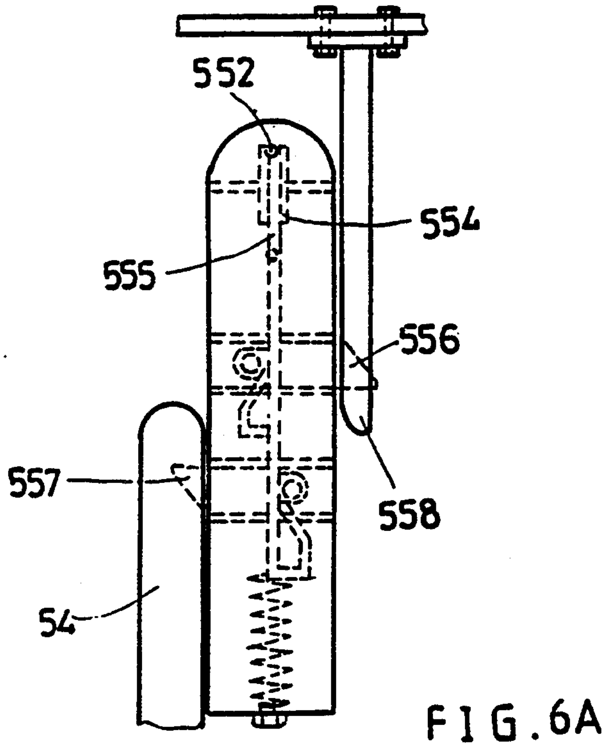
FIGS. 6A and 6B are side views showing the cushion device of this invention.
Figure 6B:
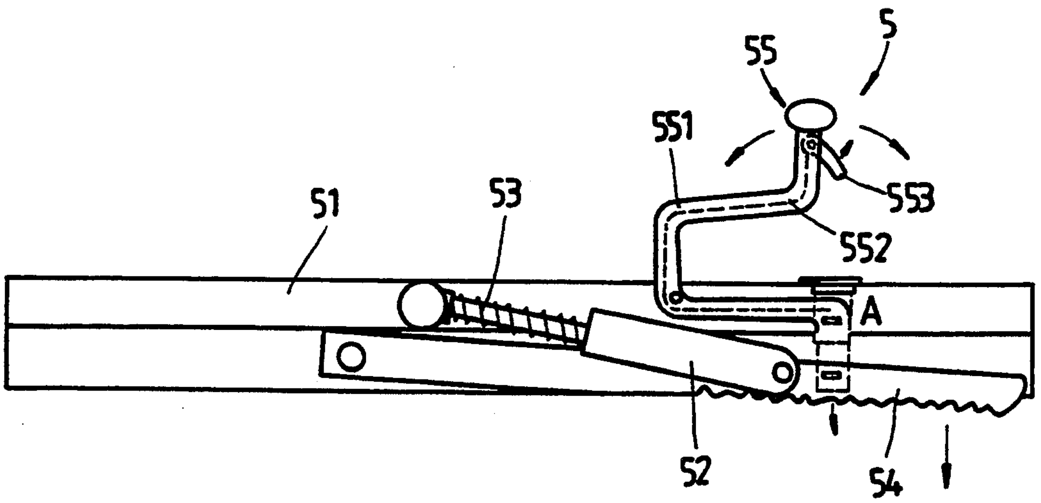

Referring to FIGS. 6A and 6B, the cushion device 5 includes a fixing base 51, a pump 52, a compression spring 53, a non-skid rod 54 and a control mechanism 55. The fixing base 51 is mounted on the bottom of the seat 1. One end of the pump 52 is hinged to the non-skid rod 54. The opposing end of the pump 52 is connected to the fixing base 51. The non-skid rod 54 has a free end with the opposing end being hinged to the fixing base 51, the contacting surface of the non-skid rod 54 is formed into buttress teeth so as to enhance the friction effect. The control mechanism 55 includes a control bar 551, a control steel line 552, a stop pin 553 and a roller 554, as shown in FIG. 6A. The control steel line 552 being twisted and fixed on the roller 554, has an end connected to a base plate 555. When the stop pin 553 is pulled down, the control steel line 552 is pulled upwardly in order to move the base plate 555 upwardly. The base plate 555 has two pins 556 and 557 which are fitted respectively to the non-skid rod 54 and the fixing plate 558. When the base plate 555 is displaced upwardly, the two pins 556 and 557 slidingly disengage from the non-skid rod 54 and the fixing plate 558. In this manner, the non-skid rod 54 moves downwardly until it contacts the ground, and the non-skid rod 54 is slowly returned by means of the pump 52 and the compression spring 53 so as to provide a cushioning effect when the wheel chair goes up or down stairs.

Figure 7A:
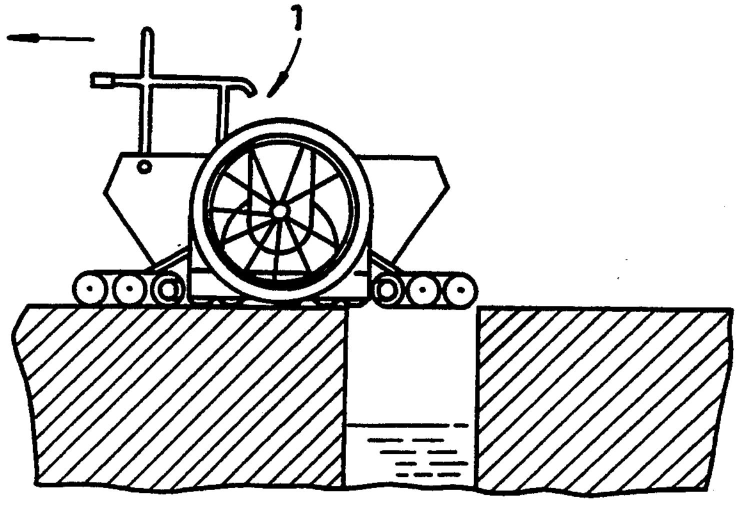
FIGS. 7A and 7B are plan views showing the wheel chair traversing a drain or ditch.
Figure 7B:
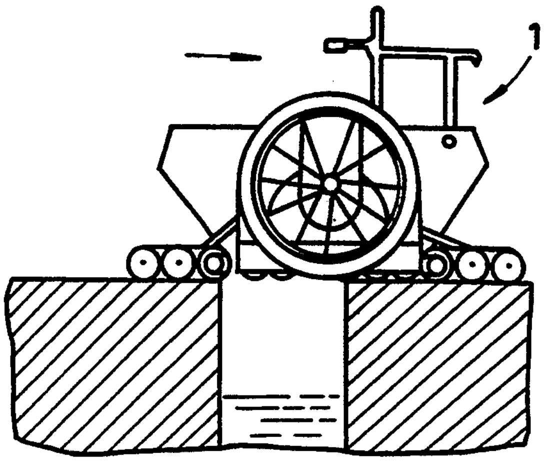
Figure 8A:
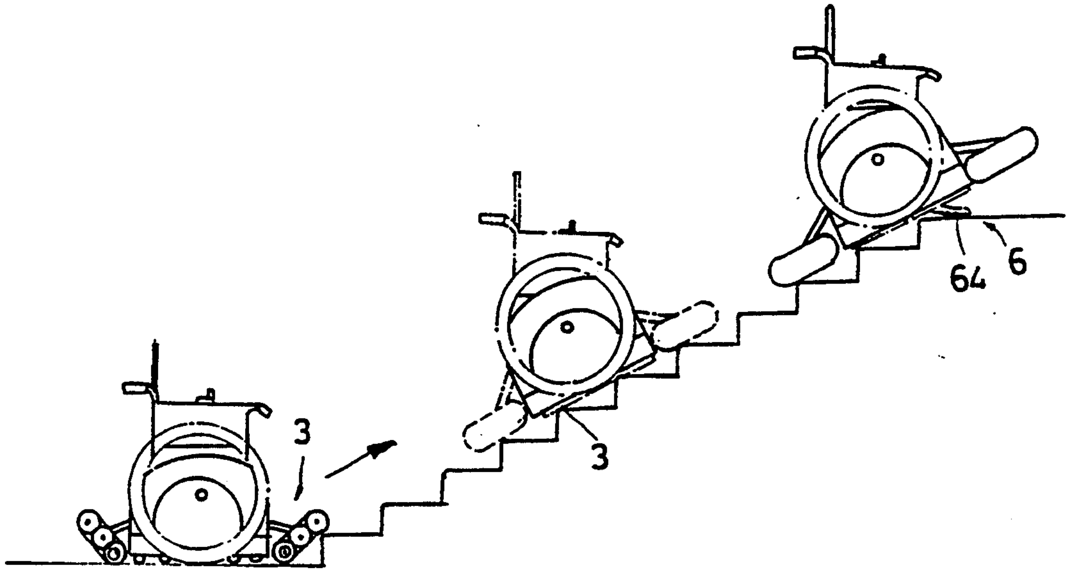
FIGS. 8A and 8B are plan views showing the wheel chair moving up and down stairs; and, FIG. 9 is a bottom plan view showing another embodiment of this invention.
Figure 8B:
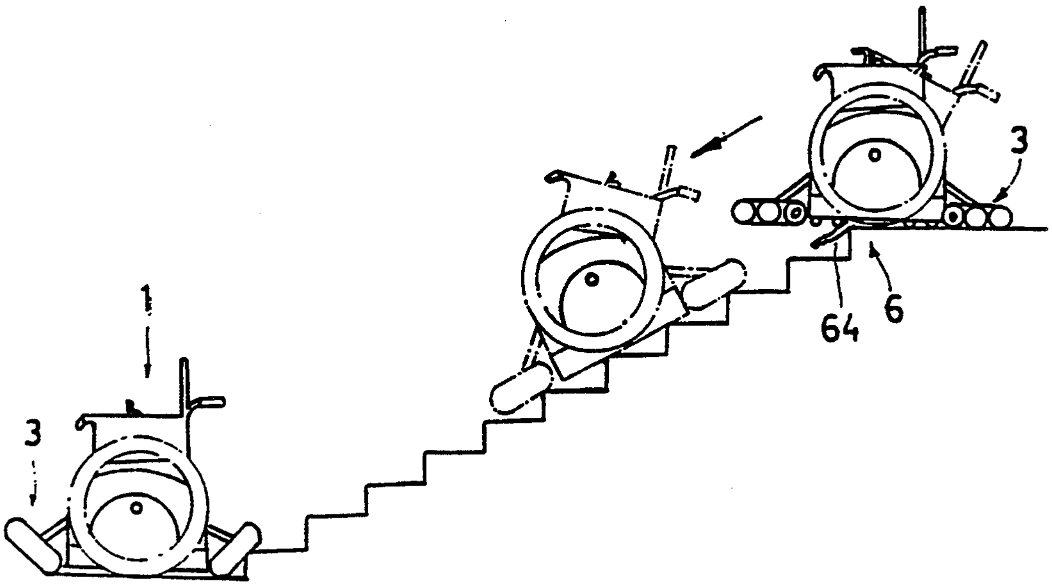

FIGS. 7A and 7B show the wheel chair crossing a ditch. The user moves the seat 1 to the rear part of the wheel chair by means of its rollers 11. The front and rear part of the track assembly 30 is regulated to contact the ground by means of the angle regulation mechanism 33. When the front portion of the track assembly 30 crosses over the ditch, the user moves the seat 1 to the front portion of the wheel chair. The wheel chair thus crosses over the ditch. Referring now to FIGS. 8A and 8B, when the wheel chair is transported up or down the stairs, the user must move the seat 1 to the inclined sections 611 or 611' of the guide groove 61 so as to maintain the seat 1 substantially parallel to the ground when the wheel chair is going up or down the stairs. The front and rear portion of the track assembly 30 is regulated to the horizontal position so as to allow the wheel chair to climb the stairs. Once the wheel chair advances beyond the last stair, it can be returned to its original status slowly by means of the cushion device 5 so as to prevent the wheel chair from interfering with the ground.

Figure 9:
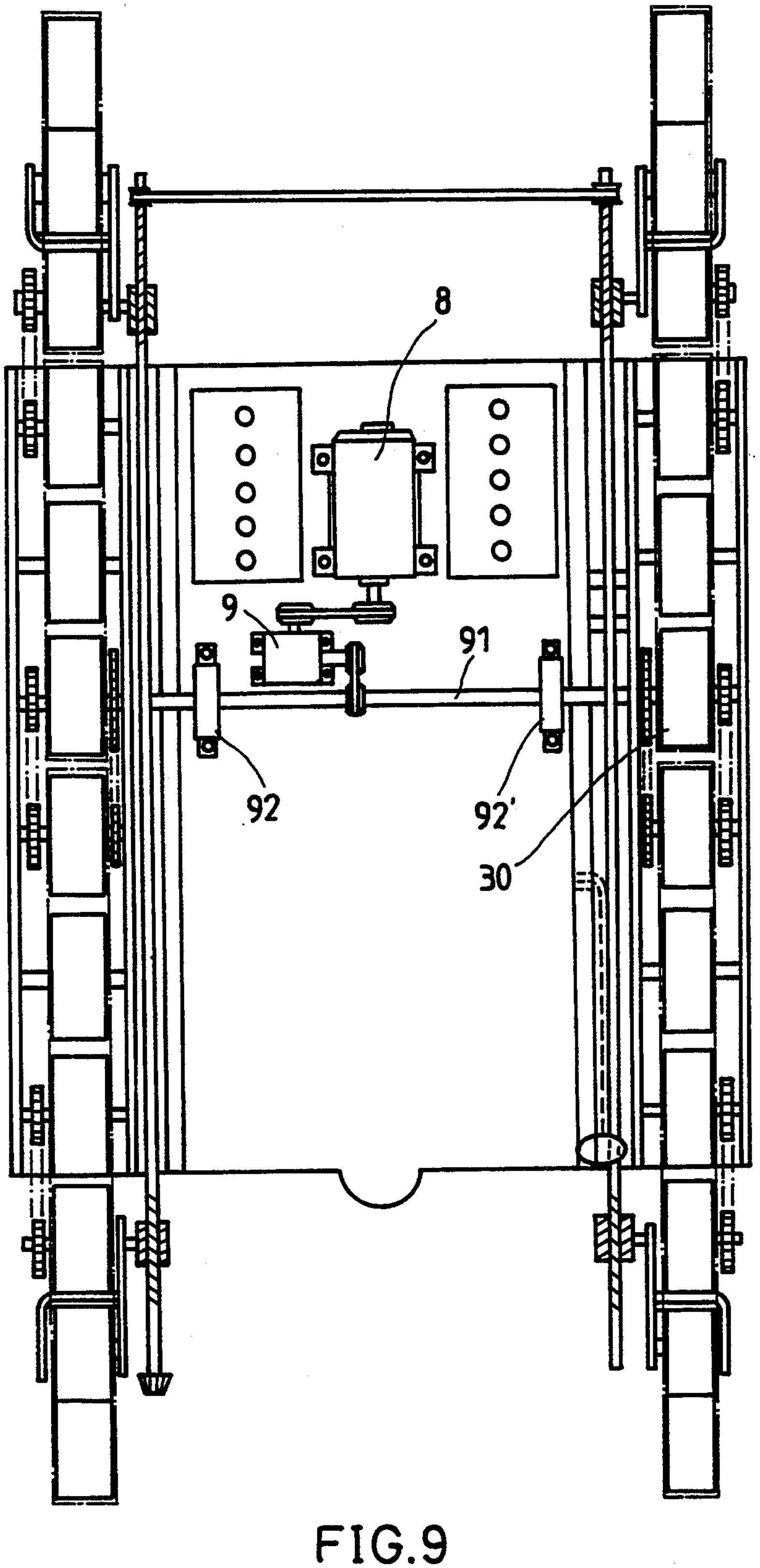

FIG. 9 shows another embodiment of this invention having a motor 8 which is installed on the bottom of the wheel chair. The motor 8 is fitted with a transmission gear box 9 and a transmission shaft 91. Two ends of the transmission shaft 91 are fitted respectively with clutches 92 and 92' which are coupled to the chain wheels 301 in order to drive the track assembly 30.

What is claimed is:

1. A wheel chair, comprising:

a seat having a plurality of rollers installed on a bottom section of a pair of opposing sides thereof, each of said opposing sides of said seat having respectively a fixing post being hinged to said seat, said fixing post having first and second ends, said first end of each of said fixing posts being fixed by a spring, and said second end being free;

a wheel assembly including a pair of main wheels having a main wheel shaft and a pair of auxiliary wheels;

a pair of side plates having respectively guide grooves formed therein, said plurality of rollers being inserted into the guide grooves, said guide grooves having opposing ends, said opposing ends of each of said guide grooves being formed into inclined sections on said respective side plates having a plurality of fixing holes formed therein, whereby when said seat is displaced within said guide grooves the free end of said fixing post is insertable into one of said fixing holes to position said seat;

a pair of track devices coupled to the main wheel shaft and suspended from said side plates, each track device including a track assembly, a lifting mechanism and an operative mechanism, wherein the lifting mechanism comprises a guide block slidable within an aperture formed in said side plates, an upper driving chain wheel, a lower driving chain wheel and a moving chain wheel, said upper and lower driving chain wheels for driving said track assembly, the moving chain wheel being coupled to said main wheel shaft and mounted between said upper and lower driving wheels for engagement by means of a double-row chain, the operative mechanism comprising a lead screw which is connected to said guide block to lift the main wheels by turning the lead screw, whereby when said lead screw is turned to lift said guide block and said moving chain wheel upwardly, said track assembly contacts the ground.

2. A wheel chair as recited in claim 1, wherein said track assembly includes a frontal and rear portion, each of which may be inclined to 45 degrees by means of an angle regulation mechanism, said angle-regulation mechanism being composed of a control bar, a driving shaft, two sliding blocks and two links, wherein the control bar and the driving shaft are engaged each to the other by a pair of interfacing bevel gears, said driving shaft having opposing ends formed with threads which respectively threadedly engage said sliding blocks, the frontal and rear portions of said track assembly being coupled to said sliding blocks by a pair of links, whereby when the control bar is rotated and said driving shaft is rotated, the two sliding blocks at opposing ends of said driving shaft are synchronously displaced.

3. A wheel chair as recited in claim 1 or 2 wherein one driving shaft of said angle-regulation mechanism is fitted with a transmission belt to connect the other driving shaft mounted on an opposing side of the wheel chair whereby said pair of angle regulation mechanisms are operated synchronously.

4. A wheel chair as recited in claim 1 or 2 wherein the bottom section of said seat has two cushion devices which provide a cushion effect when the wheel chair goes up or down the stairs, each said cushion device including a fixing base, a pump, a non-skid rod, a compression spring and a control mechanism; wherein the fixing base is fixed to said side plate, said pump having a first end hinged to said non-skid rod, and a second end end fixed to said fixing base, one end of said non-skid rod being hinged to said fixing base and the other end being free, the control mechanism comprising a control bar, a control steel line, a stop pin and a roller, wherein the control steel line has a first end which is twisted and fixed on said roller, and a second end being fixed on a base plate having two pins, said two pins being fitted respectively to said non-skid rod and a fixing plate, when said base plate is pulled upwardly by said control bar and said control steel line, the two pins are separated from said non-skid rod and said fixing plate for moving said non-skid rod downwardly until it contacts the ground, whereby said non-skid rod is displaced by the weight of the wheel chair and displaces slowly by actuation of said pump and said compression spring.

5. A wheel chair as claimed in claim 4, wherein said non-skid rod includes a contact surface being formed into a buttress tooth configuration so as to enhance frictional effects.

* * * * *